United States Patent [19]

Craft

[11] Patent Number: 5,655,581
[45] Date of Patent: Aug. 12, 1997

[54] TRACTOR-MOUNTED STUMP GRINDER WITH LATERALLY AND LONGITUDINALLY MOVABLE CUTTER WHEEL

[76] Inventor: Robert Jeffery Craft, 320 N. Jefferson, Apt. 9, Brownsburg, Ind. 46112

[21] Appl. No.: 659,202

[22] Filed: Jun. 6, 1996

[51] Int. Cl.⁶ .................................................. A01G 13/06
[52] U.S. Cl. ................. 144/24.12; 37/302; 144/334; 172/47; 180/53.3; 74/63; 464/50; 464/172
[58] Field of Search ................. 37/302; 144/24.12, 144/34.1, 334; 172/47; 180/53.1, 53.3; 74/63; 464/171, 172, 173, 50

[56] References Cited

U.S. PATENT DOCUMENTS

| | | |
|---|---|---|
| Re. 28,651 | 12/1975 | Welborn . |
| 2,601,366 | 1/1952 | Chapman . |
| 2,746,492 | 5/1956 | DeHardit . |
| 2,887,134 | 5/1959 | Bartlett . |
| 2,912,022 | 11/1959 | Ploeg et al. . |
| 2,927,613 | 3/1960 | Franzen et al. . |
| 3,198,224 | 8/1965 | Hiley . |
| 3,389,726 | 6/1968 | Good . |
| 3,732,905 | 5/1973 | Pickel . |
| 3,818,957 | 6/1974 | Schoonover . |
| 3,868,980 | 3/1975 | Blum . |
| 3,911,979 | 10/1975 | Rousseau . |
| 4,041,996 | 8/1977 | Grover . |
| 4,271,879 | 6/1981 | Shivers, Jr. et al. . |
| 4,530,385 | 7/1985 | York . |
| 4,621,668 | 11/1986 | York . |
| 4,681,145 | 7/1987 | York . |
| 4,709,736 | 12/1987 | Bellars . |
| 4,848,423 | 7/1989 | Yoder . |
| 5,158,126 | 10/1992 | Lang . |
| 5,435,359 | 7/1995 | Craft . |

OTHER PUBLICATIONS

Levco Stump Grinders Brochure (4 pages), c. 1994.
Levco Stump & Root Grinders Brochure (6 pages), c. 1994.
Arps Stump Master Hydraulically Operated Stump Cutter brochure (4 pages) c. 1960s.
Arps Stump Master Models J00 and J01 Manual (cover page), c. 1960s.
Stumpster Model 1001–3 brochure (3 pages), c. 1970.
Stumpster Model 3000 Series brochure (2 pages), c. 1994.
Rayco Stump Cutter data sheet (2 pages), c. 1990.
Arps Stump Master Models J00 and J01 Tractor Installation Manual, cover and pp. 1–10, 1969.
Arps Stump Master Models J00 and J01 Operation and Parts Manual, pp. 1–14, c. 1960s.
Vermeer Stump Cutters brochure (5 pages), 1991.
Baranyi, Sandor J., "Controlling Relative Motion of Cardan Joints", *Machine Design*, pp. 82, 86, 88, Mar. 7, 1991.

*Primary Examiner*—W. Donald Bray
*Attorney, Agent, or Firm*—Woodard, Emhardt, Naughton, Moriarty & McNett

[57] ABSTRACT

A stump grinder mountable on a three-point hitch of a conventional tractor and provided with a laterally and longitudinally movable cutter wheel. The stump grinder includes a support frame adapted for mounting on the three-point hitch, a swing frame horizontally pivotally mounted on the support frame, an elongated main beam vertically pivotally mounted on the swing frame, and a telescopic extension slidably mounted on the main beam. A side-cutting cutter wheel is rotatably mounted on the telescopic extension such that it is rotatable about a horizontal transverse rotational axis. The stump grinder is driven from the tractor power take-off with a drive line which includes first and second telescopic driveshafts and an intermediate support coupling mounted on the main beam, the driveshaft on the tractor side including a CV-joint on each end, and the driveshaft on the cutter wheel side including U-joint on each end. The support frame for the stump grinder is of sufficient height to rest upon the ground and stabilize the stump grinder during use.

27 Claims, 5 Drawing Sheets

5,655,581

TRACTOR-MOUNTED STUMP GRINDER WITH LATERALLY AND LONGITUDINALLY MOVABLE CUTTER WHEEL

BACKGROUND OF THE INVENTION

This invention relates generally to devices for removing tree stumps, and, more particularly, to tractor-mounted stump grinders, e.g., stump grinder attachments capable of being mounted on a three-point hitch of a tractor.

A number of different techniques are known for removal of tree stumps, including the use of explosives, mechanical force such as by a bulldozer, and also by comminuting or grinding the stump down to ground level and preferably below. Stump grinding has advantages over other techniques for stump removal, such as greater safety than the use of dynamite, less damage to lawns or ground surfaces surrounding the stump than with the use of bulldozers or other heavy equipment.

Numerous types of equipment for grinding stumps have been devised over the years. For example, it is known to mount stump cutter teeth on one or both faces of a cutter disc or wheel which is mounted transversely, i.e., across the longitudinal axis of a machine support frame or swing arm, with the machine moving the cutter wheel forward or backward along that axis against a portion of a stump, whereby the teeth on one face contact and grind that portion. It is also known to mount stump cutter teeth on one or both faces of a cutter wheel which is swung from side to side during a cutting operation with the teeth on one face or the other contacting and grinding a stump from the side. Examples of this latter type of equipment are described in the following patents:

| U.S. Pat. No. | Inventor | Issue Date |
| --- | --- | --- |
| 2,601,366 | Chapman | Jun. 24, 1952 |
| 2,887,134 | Bartlett | May 19, 1959 |
| 2,927,613 | Franzen | Mar. 8, 1960 |
| 3,198,224 | Hiley | Aug. 3, 1965 |
| 3,732,905 | Pickel | May 15, 1973 |
| 3,911,979 | Rousseau | Oct. 14, 1975 |
| 4,681,145 | York | Jul. 21, 1987 |
| 4,709,736 | Bellars | Dec. 1, 1987 |

Especially for tractor-mounted stump grinders, it is conventional to restrict the motion of the cutter wheel assembly to one degree of freedom and to rely on the mobility of the vehicle to which the stump grinder is attached, e.g., a tractor, for additional adjustments of position of the cutter wheel which may be necessary during operation, particularly for large tree stumps. For example, the stump grinders disclosed in the above-referenced patents to Chapman and Pickel are mounted on a hydraulically actuated tractor hitch and affixed thereto such that side to side cutting action relative to the longitudinal axis of the tractor is possible but longitudinal motion of the cutting assembly relative to the tractor is impossible.

It is time-consuming and otherwise inconvenient to move a tractor during a cutting operation, particularly the type of tractor having a power take-off (PTO) which is used to drive the cutter wheel, as in Pickel. A PTO-driven stump grinder is a substantial load on a tractor's engine and, therefore, as a practical matter must be disengaged before the tractor is driven. Repositioning of the tractor requires not only shifting of gears, but also allowance of time for the cutter wheel to substantially stop spinning and thereby avoid damage or excessive wear on the tractor drive train and the stump grinder that could otherwise result from the high inertia of the cutter wheel upon re-engagement of the PTO after moving the tractor.

The repositioning problem has been recognized and different solutions proposed. U.S. Pat. No. 2,927,613 to Franzen et al. discloses a cutting head mounted on an auxiliary frame which is arranged to slide longitudinally along a mainframe which in turn is pivotally mounted on a tractor drawbar for vertical and horizontal pivotal movement with respect thereto. There is no indication in the Franzen et al. patent that it would be useful to mount a stump grinder on a hydraulically actuated hitch, either for initial positioning or cutting height adjustment, for example, or for somehow facilitating greater stabilization for the stump grinder during use than would normally be possible with a drawbar fixed-mounted to a tractor frame.

U.S. Pat. No. 3,198,224 to Hiley proposes a stump grinder mounted on the end of a foldable boom which is attached directly to the rear frame of a tractor by means of a pivot mechanism fixed-mounted to the tractor frame. Hiley proposes the use of tractor-mounted legs which are lowered and firmly set on the ground after the tractor is moved into position near a stump. Such a stump grinder is not suitable for use on a conventional, general purpose tractor.

The problem of repositioning a tractor was also recognized in the mid-1980s by Bellars, as disclosed in U.S. Pat. No. 4,709,736, in the context of moving the tractor from stump to stump. Sellers proposes an overrun device including a one-way valve and a shutoff valve to allow the cutter wheel to continue rotating when the tractor engine is slowed down. Bellars also suggests that a three-point hitch provides inadequate stability for a stump grinder, and for additional stabilization suggests an auxiliary mounting member anchored to the tractor by left and right side brackets bolted securely to the rear axle of the tractor. Such a construction unnecessarily adds to the complexity of the stump grinder and makes it more difficult and time-consuming to attach the stump grinder to the tractor for use.

In spite of decades of activity in this area there remains a need for a relatively low-cost, reliable, easily operated, stable stump grinder capable of providing smooth yet relatively rapid cutting action.

SUMMARY OF THE INVENTION

The present invention according to one aspect thereof is a stump grinder for a tractor having a hydraulically actuated hitch, the stump grinder including a support frame adapted for mounting on the hydraulically actuated tractor hitch, and a cutter wheel supported by the support frame and rotatable about a horizontal transverse rotational axis, the cutter wheel being adjustable in position both laterally and longitudinally with respect to the tractor.

According to another aspect of the invention, a stump grinder is provided which includes a support frame, an elongated main beam horizontally pivotally mounted on the support frame, a side-cutting cutter wheel supported by the main beam and having at least one face with a plurality of cutter teeth mounted thereon, and a telescopic extension slidably mounted on the main beam.

The invention further provides a novel method of grinding a stump which includes the steps of mounting a support frame on a hydraulically actuated hitch of a tractor, supporting the cutter wheel with the support frame such that it is rotatable about a horizontal transverse rotational axis and adjustable in position both laterally and longitudinally with respect to the tractor, moving the cutter wheel through a portion of the stump by adjusting it in position with respect to the tractor in one direction, and repositioning the cutter wheel for another pass through the stump by adjusting the cutter wheel in position with respect to the tractor in a direction perpendicular to the one direction.

Another aspect of the invention is a hitch-mounted and PTO-driven stump grinder having a swing frame horizontally pivotally mounted on a support frame adapted for mounting on a hydraulically actuated tractor hitch, an elongated main beam vertically pivotally mounted on the swing frame, a telescopic extension slidably mounted on the main beam, a side cutting cutter wheel rotatably mounted on the telescopic extension and rotatable about a horizontal tranverse rotational axis, and a PTO drive line including a telescopic driveshaft having a constant-velocity joint on each end, wherein the support frame is of sufficient height to rest upon the ground with the cutter wheel suspended above ground when the hitch is lowered, whereby the support frame stabilizes the stump grinder in use.

A general object of the present invention is to provide an improved stump grinder.

Another object is to provide a stump grinder offering high stability and efficiency of operation and adapted for mounting on a conventional tractor.

These and other objects and advantages of the present invention will become apparent upon reading the following detailed description of the preferred embodiment in conjunction with the accompanying drawings.

DESCRIPTION OF THE PREFERRED EMBODIMENT

Figure 1:
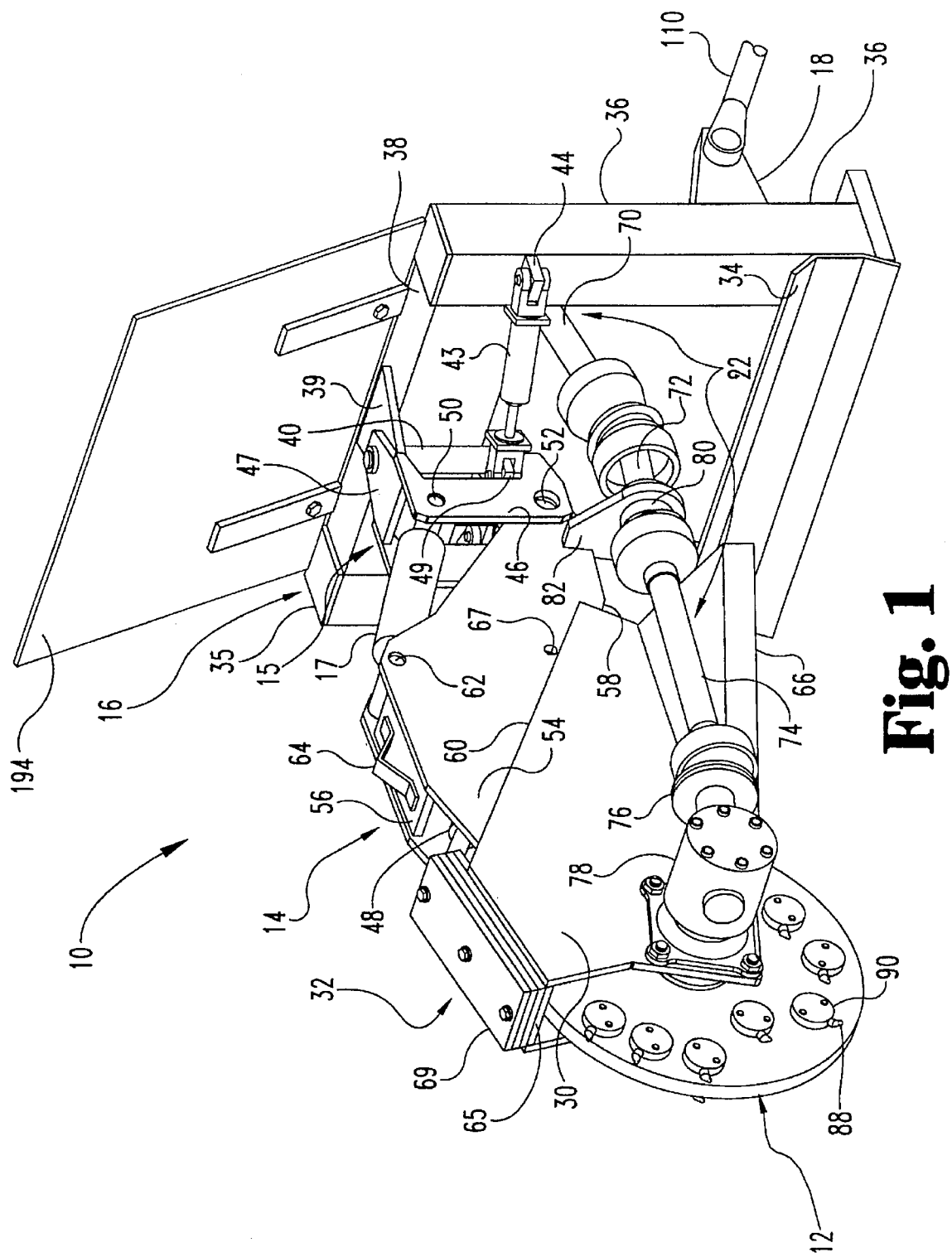
FIG. 1 is an upper right rear perspective view of the preferred embodiment of the stump grinder according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates. The word "wheel" as used herein is intended to encompass drums, discs, disc-like hubs, generally circular blades, plates and the like.

Figure 4:
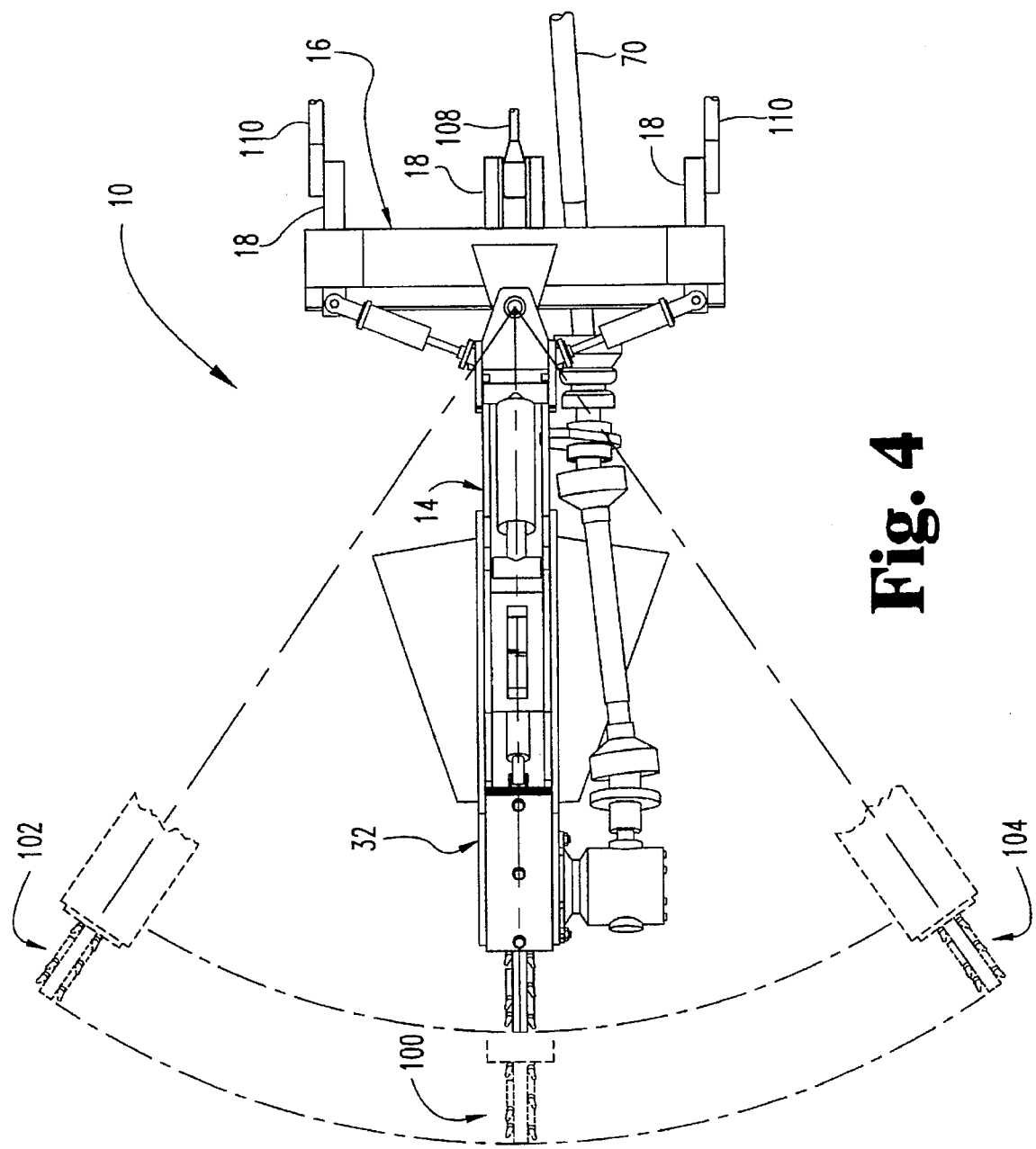
FIG. 4 is a top view of the stump grinder of FIG. 2, showing the lateral and longitudinal ranges of motion of the stump grinder.

With reference to FIGS. 1–4, the presently preferred embodiment of a stump grinder 10 according to the present invention has a cutter wheel 12 supported by an elongated main beam 14 which is pivotally mounted, via a swing frame 15, on a support frame 16 which is designed to be vertically oriented in use to allow movement of the main beam and cutter wheel in a horizontal plane for transverse cutting of a stump. The support frame includes three hitch attachment points or brackets 18 for supporting the stump grinder on a three-point hitch of a tractor 20 so equipped. The swing frame allows the main beam to swing left and right, and also provides for vertical pivoting of the main beam under control of a hydraulic cylinder 17. The cutter wheel is rotatably mounted on a telescopic extension 32 which is slidably mounted on the main beam such that the cutter wheel rotates in a vertical plane which is aligned with the longitudinal axis of the main beam. The cutter wheel is longitudinally extendable via the telescopic extension toward and away from the support frame and thus the tractor. A drive line 22 having multiple shafts, as will be described, is provided to interconnect the cutter wheel and the power take-off 24 of the tractor. The lateral and longitudinal ranges of motion of the stump grinder are illustrated in FIG. 4, in which the nominal position is shown with solid lines. The extended position of the cutter wheel from the nominal position is illustrated at 100, and corresponding extended positions of the cutter wheel to the left and right of the longitudinal axis of the tractor on which the stump grinder is mounted (as viewed from the rear) are illustrated at 102 and 104, respectively.

The stump grinder includes a backfill blade 34 on the bottom of support frame 16 and extending laterally between left and right vertical frame members 35 and 36 thereof. A cross beam 38 is welded to frame members 35 and 36 at the top of the support frame, and includes upper and lower horizontal trapezoidal plates 39 extending rearwardly from the support frame as pivot supports for a trunion 40 to which swing frame 15 is horizontally pivotally connected via pivot pin mounted in the trunion in a conventional manner. The backfill blade together with the pads 41 on the bottom of the vertical frame members provides ground support and, therefore, enhanced stability during a cutting operation, and also makes it possible to backfill the hole created by the stump grinding operation, as will be described.

The lateral position of the elongated main beam with respect to its nominal center position in line with the longitudinal axis of the tractor is controlled by left and right swing cylinders 42 and 43, which are attached on their outer ends to left and right side vertical frame members 35 and 36, respectively, and attached on their inner ends, which are preferably the rod ends, to the swing frame, as will be described later in more detail. The two swing cylinders are hydraulic cylinders connected by conventional hoses (not shown) to a hydraulic control valve which may be one of the auxiliary hydraulic valves on the tractor itself or may be a separate hydraulic valve mounted on the tractor for operation of the stump grinder. The swing cylinders are tie rod type cylinders with a 3" bore and 6" stroke. A mounting bracket 44 is welded onto the upper rear of each vertical frame member of the support frame for attachment of the swing cylinders. The rod end of each swing cylinder is attached to the swing frame, which will now be described in further detail.

The swing frame has a pair of vertical side plates 46 which are welded on either side of a pair of horizontal flanges 47 which are attached to trunion 40 in a conventional manner for horizontal pivotal motion. Side plates 46 are made of A36 HRS (hot rolled steel) and have a plate thickness of ¾", a height of approximately 14" and a maximum longitudinal length of approximately 7.5". Swing frame flanges 47 are also made of ¾" A36 HRS, and are approximately 8.5" long and 7" wide (maximum width). A cross member 49 of 1"×2" cold rolled steel, and approximately 10" long, is welded to the forward edges of side plates 46 and extends outwardly therefrom almost 1" on each side, and is provided with a mounting hole on each end for pivotal connection, via a connecting pin mounted through each hole, to the clevis of a swing cylinder such that the pivot axis of the rod end of the cylinder lies in the plane of the side plate. Each side plate includes a pair of holes 50 and 52 for pivotal support of the lift cylinder 17 and the forward end of main beam 14, respectively.

The main beam has a pair of parallel side plates 54 made of ½" A36 HRS and spaced apart from each other approximately 5" by means of suitable cross members such as cross member 56 welded thereto. Each side plate 54 has a lower edge 58 extending parallel to an upper forward edge 60 of the associated telescopic extension side plate 30; the maximum dimension of each side plate 54 along a line parallel to those edges is approximately 45", and each side plate has a dimension of approximately 14" along a line perpendicular to those edges and extending through pivot point 62. Lift cylinder 17 extends between pivot points 50 and 62 and is preferably a welded-type cylinder with a 4" bore and 10" stroke. The stump grinder is advantageously also provided with a lift point 64 on the top of the main beam for lifting and transport of the stump grinder.

Figure 2:
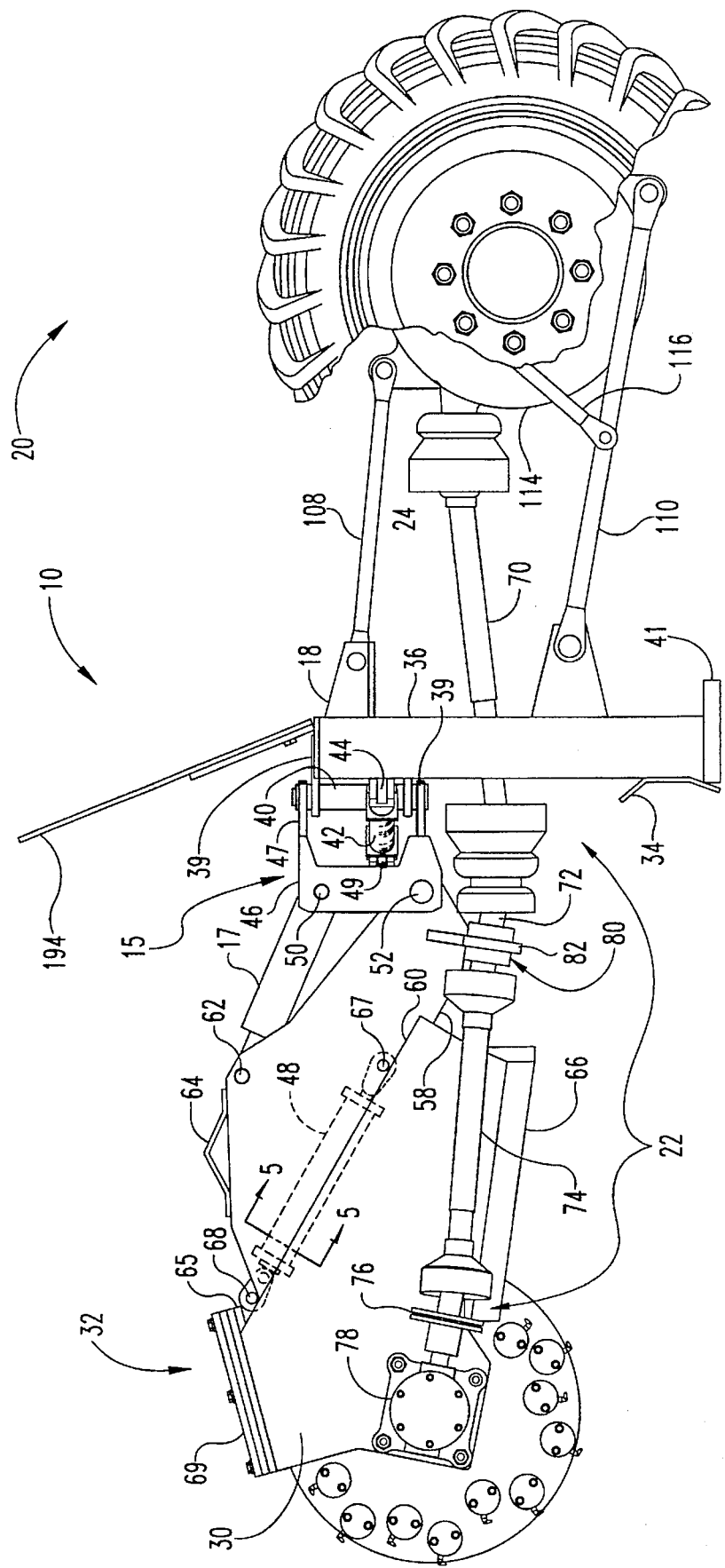
FIG. 2 is a right side view of the stump grinder of FIG. 1 shown attached to a tractor with a three-point hitch and a power take-off.
Figure 3:
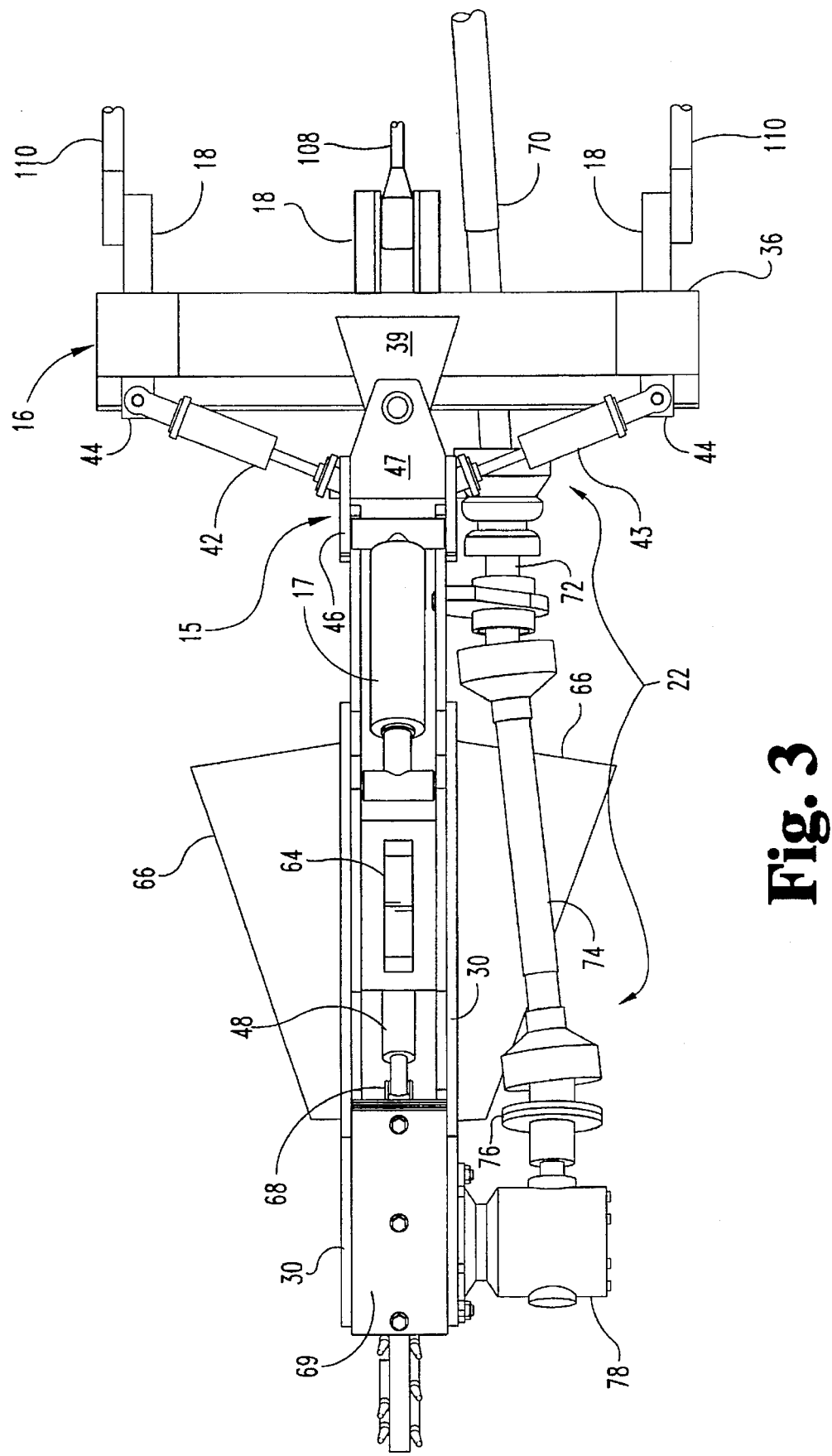
FIG. 3 is a top view of the stump grinder of FIG. 2.

The telescopic extension includes a pair of parallel side plates 30, of ¾" A36 HRS, preferably having a maximum dimension of approximately 46" along a line parallel to edge 60, and a dimension of approximately 20" along a perpendicular line from edge 60 to the output drive shaft axis of gearbox 78. Side plates 30 are spaced apart by approximately 8" by suitable cross members such as cross member 65 and have welded thereto at the bottom of each plate a steel shield 66 to block the spray of wood chips and sawdust. The telescopic extension is extended and retracted by an internally mounted hydraulic cylinder 48 attached on one end 67 to the main beam and on the other end 68 to a bracket provided for that purpose on cross member 65 of the telescopic extension. Extension cylinder 48 is of the tie rod type and preferably has a 2" bore and 16" stroke. The telescopic extension also includes a set of counterweights 69 mounted as shown in FIGS. 1 and 2.

Drive line 22 includes a first telescopic drive shaft 70 having a constant velocity (CV) joint on each end, one of which is connected to the spline of PTO 24, an intermediate shaft 72, a second telescopic drive shaft 74 having a universal joint on each end, a slip clutch 76, and a gear box 78 which directly drives the cutter wheel. A suitable gear box for the stump grinder of the present invention is commercially available from Bondioli and Pavesi as Model No. 3100 with a 1.5:1 input-to-output ratio. The cutter wheel is preferably a generally circular plate approximately 30" in diameter with parallel faces and a thickness of approximately 1½", and is welded onto a hub which is secured with a castellated nut on the tapered spline of the gear box output shaft. The cutter wheel is thus cantilever-mounted on the output shaft of the gear box, which is bolted to the right side plate of the telescopic extension as shown in the drawings.

The intermediate shaft 72 is fixed in position relative to the main beam by a carrier bearing housing 80 which includes a pair of Timken tapered roller bearings in a cylindrical housing which is supported by a gusset 82 welded to the right side of the main beam. The intermediate shaft is mounted parallel to the longitudinal axis of the main beam, as is the input shaft of the gear box, and the intermediate shaft and gear box input shaft are also parallel to each other vertically. Thus, driveshaft 74 is at the same vertical and horizontal angles with respect to each of those shafts. This angular relationship compensates for angular velocity differences between those shafts and driveshaft 74 during operation, as is more fully explained in the above-referenced U.S. Pat. No. 5,435,359 incorporated by reference. Suitable telescopic drive shafts 70 and 74 are commercially available from Bondioli and Pavesi; shaft 70 is preferably a size 6 CV-joint type shaft assembly with a length of approximately 24" and 34" in its collapsed and extended states, respectively, and shaft 74 is preferably a size 6 PTO U-joint type shaft assembly with a length of approximately 28" and 45" in its collapsed and extended states, respectively. A suitable slip clutch is commercially available from Bondioli and Pavesi in the #6 size.

The cutter wheel preferably has multiple cutter teeth 88 attached to its left and right faces by respective tooth holders 90 which are bolted to the cutter wheel faces in a conventional manner. One suitable tooth holder is the "Smart Pocket" available from Border City Tool and Manufacturing Company of Warren, Mich., which also supplies suitable cutter teeth. The precise pattern or arrangement of the cutter teeth is not particularly important to this invention. The pattern is such as to ensure that the cutter teeth collectively traverse the entire face of a stump portion to be cut away during each revolution of the cutter wheel, preferably with slightly overlapping circular cutting tracks with a combined radial span of approximately 3", corresponding to the maximum cutting depth on a single pass. Examples of suitable mounting patterns for the cutter teeth may be found on stump grinders produced by Vermeer, Carlton and Rayco.

Figure 5:
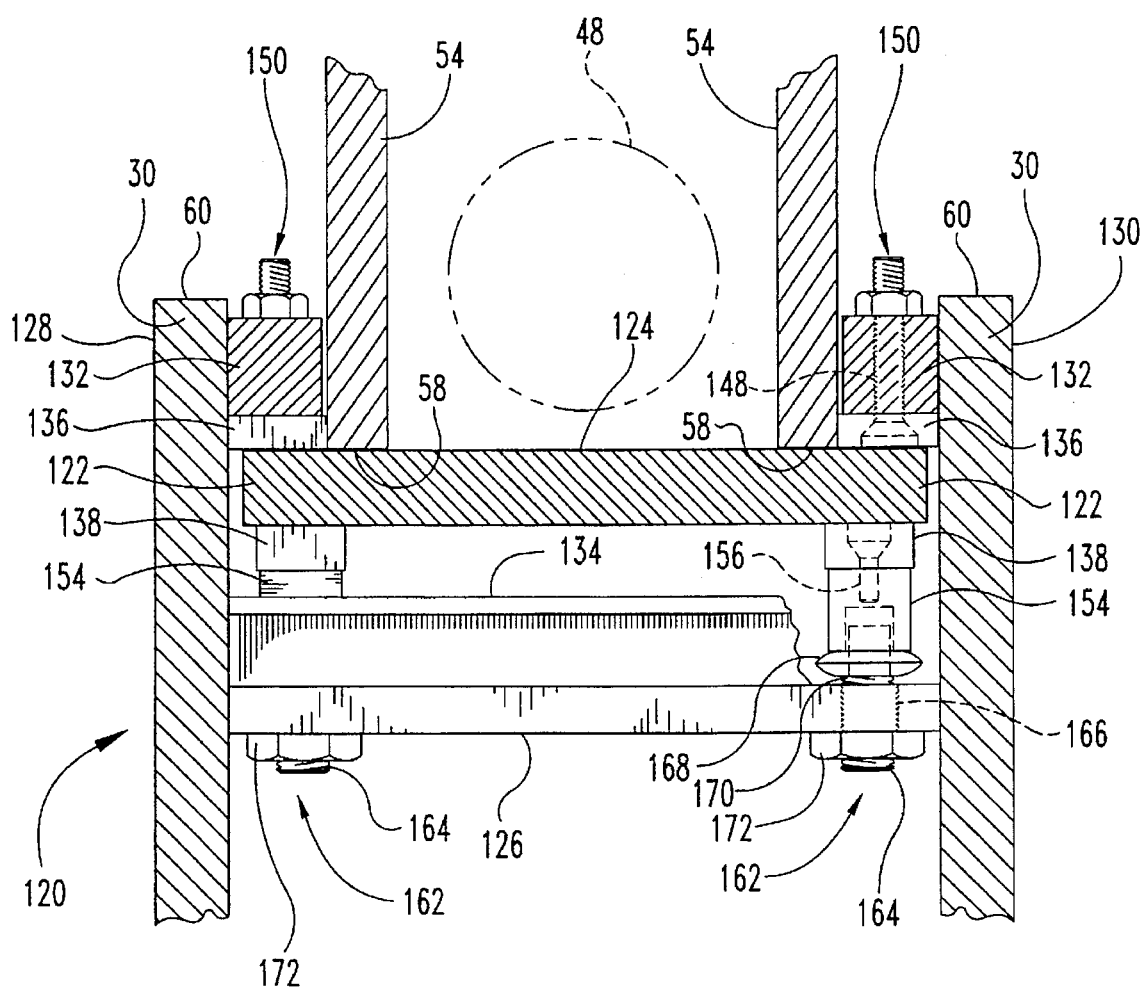
FIG. 5 is a sectional view taken along lines 5—5 in FIG. 2.

As perhaps best shown in FIG. 5, the upper portion of the telescopic extension along edge 60 includes a slider carriage 120 which is slidably mounted on opposite lateral ends 122 of a longitudinally elongated flat plate 124 which is welded to the bottom edges 58 of the main beam side plates 54. A suitable material for the carriage mounting plate 124 is 1"×8" cold rolled steel. The slider carriage preferably includes three longitudinally elongated bottom plates 126, approximately 4" long each (i.e., in the direction into the page of FIG. 5), welded between side plates 30, a slide rail 132 welded to and extending along the inside surface of each side plate, and a support brace 134 on the front and rear of each bottom plate. Each brace is formed of angle iron and is welded between the side plates and its associated bottom plate.

The slider carriage utilizes an upper set of longitudinally elongated slider blocks 136 and a lower set of longitudinally elongated slider blocks 138 in a zero-lash configuration, i.e., with zero clearance between them and the carriage mounting plate, the upper set being secured as stationary blocks and lower set being mounted as floating blocks in the preferred embodiment. The floating blocks 138 are spring-loaded to maintain zero lash in the presence of taper and other irregularities in metal surfaces, particularly the mounting plate, and also wear on the slider blocks. A suitable material for the slider blocks is ultra high molecular weight (UHMW) polyethylene. The blocks are preferably 4" long each, corresponding with the lengths of their respective bottom plates. One-half inch is a suitable block height, and the block width is selected such that the stationary blocks fit snugly between the associated side plates of the main beam and telescopic extension, leaving a desired amount of clearance, e.g., approximately ⅛", between the bare metal surfaces of side plate 30 and the lateral edges of carriage mounting plate 124, and also clearance between plates 54 and slide rails 132.

The carriage slide rails 132 are provided with through holes 148 and the stationary blocks are secured thereto by countersunk screws 150 and lock nuts 152. Each floating block is screwed onto an elongated base 154, also preferably 4" long, which is provided with a pair of threaded holes 156 in its top surface for this purpose. The bottom of the base is counterbored as at 158 to engage the unthreaded ends 160 of a pair of dogpoint set screws 162; the threaded end 164 of each dogpoint screw is screwed into one of the carriage bottom plates, which are provided with threaded holes 166 for this purpose. Bellville washers 168 are stacked on the unthreaded end of each dogpoint screw between the shoulder 170 of the screw and the floating base, as shown in FIG. 5, thus enabling the floating blocks to be upwardly spring-biased toward the bottom of carriage mounting plate 124 by adjustment of the dogpoint screws. Preferably there are four Bellville washers in each stack, although a stack of two as illustrated may be found adequate. The dogpoint screws are secured in position by lock nuts 172. The floating bases are counterbored on the bottom sufficiently to allow for compression of the Bellville spring stack and for corresponding clearance within the floating base for the upper end of the adjustment screw 162, which is preferably tightened sufficiently to produce 4000 pounds of compression per stack. The slider blocks are countersunk as shown in FIG. 5 to allow for a desired amount of acceptable wear on their surfaces contacting the carriage mounting plate before replacement of the slider blocks. The carriage mounting configuration including the UHMW blocks and Bellville spring stack as just described automatically compensates for wear on the slider blocks and thereby maintains low-friction, zero-lash operation. Further details of the construction of the telescopic extension and of other aspects of the present invention are illustrated and described in U.S. Pat. No. 5,435,359, which is hereby incorporated by reference in its entirety.

Although certain principles of the present invention are considered applicable to stand-alone and towable stump grinders, the preferred embodiment of the stump grinder according to the present invention is particularly suited for attachment to a tractor having a conventional three-point hitch and nominal 540 rpm PTO drive. Returning to FIG. 2, mounting brackets 18 extend forward from main support frame 16 of the stump grinder for attachment to the upper link 108 and lower links 110 of a three-point hitch. The links of the three-point hitch are pivotally mounted on the tractor transaxle 114 as shown in FIG. 2, and are raised by action of control arms 116, which are pulled upward and forward hydraulically.

Each mounting bracket 18 may have multiple mounting holes provided therein for variable control of the spacing between the tractor and the support frame of the stump grinder, in which case, in setting up the stump grinder, an appropriate hole within each lower mounting bracket 18 is selected so as to obtain a desired horizontal spacing. Then an appropriate hole within the upper mounting bracket is selected along with an appropriate length of top link 108, which is adjustable in length, such that the support frame is vertically oriented and remains substantially so, independent of hitch position.

As shown in FIG. 1, the stump grinder is also preferably provided with a shield 194 which is preferably clear polycarbonate to protect the operator from any flying debris which might travel in his direction while allowing him to maintain visual contact with the cutting operation.

In operation, the stump grinder attached to a three-point hitch of a tractor is maneuvered into position by moving the tractor with the hitch in its uppermost position, whereby the stump grinder is raised well above ground level. With the cutter wheel positioned to one side of the stump, the hitch links are lowered until the support frame pads and the backfill blade rest on the ground. The lift cylinder is adjusted for a desired first cutting depth and the main beam is then swung with the swing cylinders such that the cutter wheel moves from right to left or left to right across a portion of the stump. After each lateral pass, the cutter wheel may be lowered with the lift cylinder and swung through the stump again at a lower depth, or the cutter wheel may be extended longitudinally and then swung through a portion of the stump remaining at the same height, thereby affording the operator extensive flexibility in use of the device. The stump may be completely ground down below ground level, after which the resulting hole in the ground may be filled simply by moving the tractor and using the backfill blade to push dirt and/or wood chips and saw dust from the grinding operation into the hole, lifting the stump grinder with the three-point hitch and maneuvering the tractor as necessary for that purpose.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. For example, although a mechanical connection to the PTO output shaft of a tractor is preferred, it may be adequate in some applications to drive the cutter wheel with a hydraulic motor connected to the hydraulic system of the tractor or to a dedicated hydraulic system provided on the stump grinder itself, or with an internal combustion engine provided on the stump grinder. Also, although it has been found preferable with the stump grinder as described above to have three longitudinally spaced slider block mechanisms in the slider carriage, a greater or lesser number and/or different dimensions of slider block mechanisms may be employed in accordance with the teachings provided herein.

I claim:

1. A stump grinder for a tractor having a hydraulically actuated hitch, said stump grinder comprising:
   a support frame;
   means for mounting said support frame on the hydraulically actuated tractor hitch; and
   a cutter wheel supported by said support frame and rotatable about a horizontal transverse rotational axis, said cutter wheel being adjustable in position both laterally and longitudinally with respect to the tractor.

2. The stump grinder of claim 1, further comprising an elongated main beam horizontally pivotally mounted on said support frame, wherein said cutter wheel is supported by main beam.

3. The stump grinder of claim 2, further comprising a drive line including means on one end for connecting to the tractor power take-off and connected on the opposite end to said cutter wheel.

4. The stump grinder of claim 3, further comprising a telescopic extension slidably mounted on said main beam, wherein said cutter wheel is rotatably mounted on and thereby supported by said telescopic extension.

5. The stump grinder of claim 4, wherein said support frame is of sufficient height to rest upon the ground with said cutter wheel suspended above ground when the hydraulically actuated tractor hitch is lowered, whereby said support frame stabilizes said stump grinder during use.

6. The stump grinder of claim 5, further comprising a swing frame horizontally pivotally mounted on said support frame, wherein said main beam is vertically pivotally mounted on said swing frame and horizontally fixed in position relative to said swing frame whereby said main beam is horizontally pivotally mounted on said support frame via said swing frame.

7. The stump grinder of claim 6, further comprising a backfill blade mounted on the bottom portion of said support frame.

8. The stump grinder of claim 7, wherein said telescopic extension includes a slider carriage and a plurality of zero-lash, wear-compensated slider blocks interconnecting said slider carriage and said main beam.

9. The stump grinder of claim 8, wherein said drive line includes a telescopic drive shaft having a constant-velocity joint on each end.

10. The stump grinder of claim 9, wherein said drive line includes first and second telescopic drive shafts and an intermediate support coupling mounted on said main beam, said first drive shaft including a constant-velocity joint on each end, said second drive shaft including a universal joint on each end.

11. The stump grinder of claim 1, further comprising a drive line including means on one end for connecting to the tractor power take-off and connected on the opposite end to said cutter wheel, said drive line including first and second telescopic drive shafts and an intermediate support coupling mounted on said main beam, said first drive shaft including a constant-velocity joint on each end, said second drive shaft including a universal joint on each end.

12. The stump grinder of claim 1, further comprising a telescopic extension slidably mounted on said main beam.

13. The stump grinder of claim 1, wherein said support frame is of sufficient height to rest upon the ground with said cutter wheel suspended above ground when the hydraulically actuated tractor hitch is lowered, whereby said support frame stabilizes said stump grinder during use.

14. The stump grinder of claim 1, further comprising a swing frame horizontally pivotally mounted on said support frame, wherein said main beam is vertically pivotally mounted on said swing frame and horizontally fixed in position relative to said swing frame whereby said main beam is horizontally pivotally mounted on said support frame via said swing frame.

15. The stump grinder of claim 1, further comprising a backfill blade mounted on the bottom portion of said support frame.

16. A stump grinder, comprising:

a support frame;

an elongated main beam horizontally pivotally mounted on said support frame;

a side-cutting cutter wheel supported by said main beam, said cutter wheel having at least one face with a plurality of cutter teeth mounted thereon; and a telescopic extension slidably mounted on said main beam.

17. The stump grinder of claim 16, wherein said telescopic extension includes a slider carriage and a plurality of zero-lash, wear-compensated slider blocks interconnecting said slider carriage and said main beam.

18. The stump grinder of claim 17, wherein said support frame is of sufficient height to rest upon the ground with said cutter wheel suspended above ground when the hydraulically actuated tractor hitch is lowered, whereby said support frame stabilizes said stump grinder during use.

19. The stump grinder of claim 18, further comprising a swing frame horizontally pivotally mounted on said support frame, wherein said main beam is vertically pivotally mounted on said swing frame and horizontally fixed in position relative to said swing frame whereby said main beam is horizontally pivotally mounted on said support frame via said swing frame.

20. The stump grinder of claim 19, further comprising a backfill blade mounted on the bottom portion of said support frame.

21. The stump grinder of claim 20, further comprising a drive line including means on one end for connecting to the tractor power take-off and connected on the opposite end to said cutter wheel, said drive line including first and second telescopic drive shafts and an intermediate support coupling mounted on said main beam, said first drive shaft including a constant-velocity joint on each end, said second drive shaft including a universal joint on each end.

22. A method of grinding a stump, said method comprising the steps:

mounting a support frame on a hydraulically actuated hitch of a tractor;

supporting a cutter wheel with said support frame such that it is rotatable about a horizontal transverse rotational axis and adjustable in position both laterally and longitudinally with respect to the tractor;

moving said cutter wheel through a portion of the stump by adjusting said cutter wheel in position with respect to the tractor in one direction; and repositioning said cutter wheel for another pass through the stump by adjusting said cutter wheel in position with respect to the tractor in a direction perpendicular to said one direction.

23. The method of claim 22, wherein said moving step includes swinging said cutter wheel laterally through the stump with an elongated main beam horizontally pivotally mounted on said support frame supported on the tractor.

24. The method of claim 23, wherein said repositioning step includes telescopically extending said main beam.

25. The method of claim 24, wherein said cutter wheel is a side-cutting wheel, further comprising the step of driving said side-cutting cutter wheel from the power take-off of the tractor.

26. A stump grinder for a tractor having a hydraulically actuated hitch, said stump grinder comprising:

a support frame;

means for mounting said support frame on the hydraulically actuated tractor hitch;

a swing frame horizontally pivotally mounted on said support frame;

an elongated main beam vertically pivotally mounted on said swing frame;

a telescopic extension slidably mounted on said main beam;

a side-cutting cutter wheel rotatably mounted on said telescopic extension and rotatable about a horizontal transverse rotational axis; and a drive line including means on one end for connecting to the tractor power take-off and connected on its opposite end to said cutter wheel, said drive line including a telescopic drive shaft having a constant-velocity joint on each end;

wherein said support frame is of sufficient height to rest upon the ground with said cutter wheel suspended above ground when the hydraulically actuated tractor hitch is lowered, whereby said support frame stabilizes said stump grinder during use.

27. The stump grinder of claim 26, wherein said drive line includes first and second telescopic drive shafts and an intermediate support coupling mounted on said main beam.

* * * * *